US012641210B1

(12) United States Patent
Poot

(10) Patent No.: US 12,641,210 B1
(45) Date of Patent: May 26, 2026

(54) TIME-VARYING RENDERING OF AN OBJECT WITHIN A 3D ENVIRONMENT

(71) Applicant: Apple Inc., Cupertino, CA (US)

(72) Inventor: Rudy Poot, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 18/233,434

(22) Filed: Aug. 14, 2023

Related U.S. Application Data

(60) Provisional application No. 63/407,868, filed on Sep. 19, 2022.

(51) Int. Cl.
| | |
|---|---|
| *H04N 13/275* | (2018.01) |
| *G06T 13/20* | (2011.01) |
| *G06T 15/00* | (2011.01) |
| *G06T 17/20* | (2006.01) |

(52) U.S. Cl.
CPC ........... *H04N 13/275* (2018.05); *G06T 13/20* (2013.01); *G06T 15/005* (2013.01); *G06T 17/20* (2013.01)

(58) Field of Classification Search
CPC ..... H04N 13/275; G06T 13/20; G06T 15/005; G06T 17/20
See application file for complete search history.

(56) References Cited

U.S. PATENT DOCUMENTS

| | | | |
|---|---|---|---|
| 10,636,199 B2 | 4/2020 | Clement et al. | |
| 2017/0032569 A1* | 2/2017 | Rondao Alface .... | H04N 13/282 |
| 2018/0144547 A1* | 5/2018 | Shakib ................. | G06T 15/503 |

| | | | |
|---|---|---|---|
| 2019/0025590 A1 | 1/2019 | Haddick | |
| 2020/0066030 A1 | 2/2020 | Naik et al. | |
| 2020/0320794 A1 | 10/2020 | Huang et al. | |
| 2021/0056763 A1* | 2/2021 | Molyneaux .......... | G02B 27/017 |

(Continued)

FOREIGN PATENT DOCUMENTS

| | | |
|---|---|---|
| WO | WO 2017031089 | 2/2017 |
| WO | WO 2021176133 | 9/2021 |

OTHER PUBLICATIONS

Boos, Kevin; Cu, David and Cuervo, Eduardo; "FlashBack: Immersive Virtual Reality on Mobile Devices via Rendering Memoization", Jun. 25-30, 2016, Singapore; pp. 1-13.

(Continued)

*Primary Examiner* — Michelle Chin
(74) *Attorney, Agent, or Firm* — Thompson Hine LLP

(57) ABSTRACT

Various implementations disclosed herein include devices, systems, and methods that provide a view of a three-dimensional (3D) environment including a time-varying rendering of an object. An example process may include generating a representation including one or more sheets representing an object, and the one or more sheets representing aspects of one or more meshes partially representing a 3D appearance of the object based on multiple viewpoints and multiple temporal representations. Generating the representation may include obtaining images of the object from the multiple viewpoints within a pre-defined region, generating the one or more meshes of polygons based on the images and generating the one or more sheets based on the one or more meshes. The method may further include providing a view of a 3D environment including a time-varying rendering of the object that is rendered based on the one or more sheets representing the object.

20 Claims, 6 Drawing Sheets

(56)                    References Cited

U.S. PATENT DOCUMENTS

| 2021/0150802 | A1* | 5/2021 | Varekamp | ............ | H04N 13/194 |
| 2021/0233315 | A1 | 7/2021 | Jung | | |
| 2021/0383590 | A1* | 12/2021 | Roimela | .............. | H04N 19/597 |
| 2022/0139026 | A1* | 5/2022 | Nourai | .................... | G06T 15/10 |
| | | | | | 345/419 |

OTHER PUBLICATIONS

Marner, Michael R.; Smith, Ross T.; Walsh, James A.; Thomas, Bruce H.; "Spatial User Interfaces for Large-Scale Projector-Based Augmented Reality"; Nov./Dec. 2014; IEEE Computer Society; pp. 74-82.

* cited by examiner

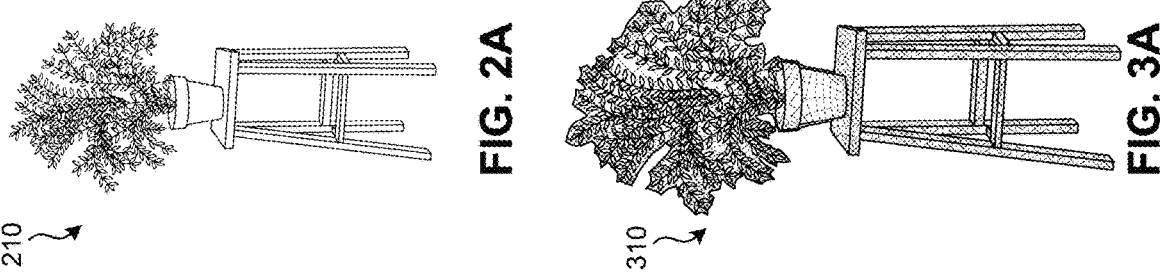
230 — FIG. 2C
330 — FIG. 3C
220 — FIG. 2B
320 — FIG. 3B
210 — FIG. 2A
310 — FIG. 3A

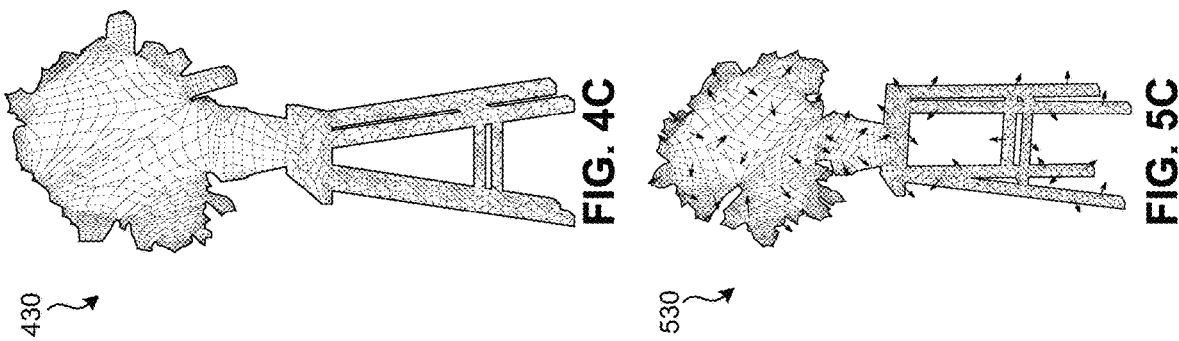
410
FIG. 4A
510
FIG. 5A
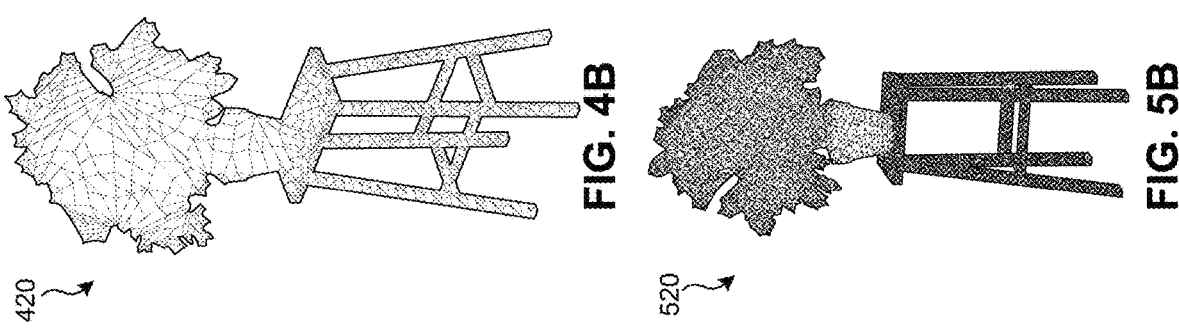
420
FIG. 4B
520
FIG. 5B
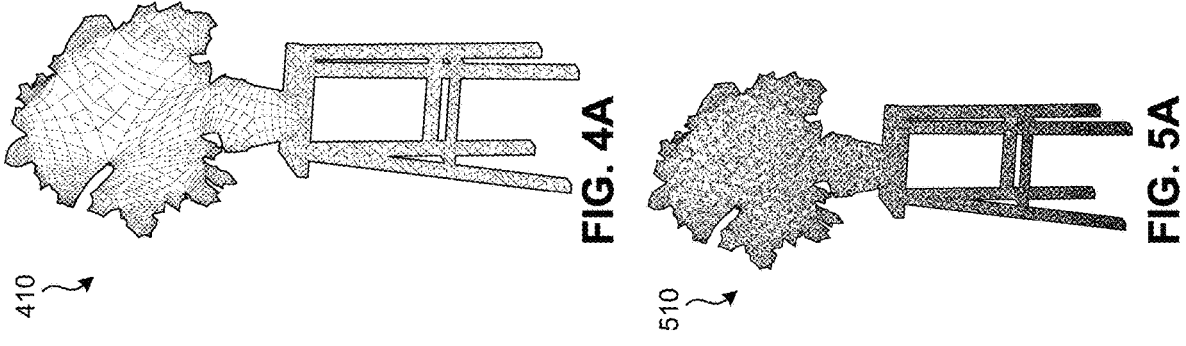
430
FIG. 4C
530
FIG. 5C

800

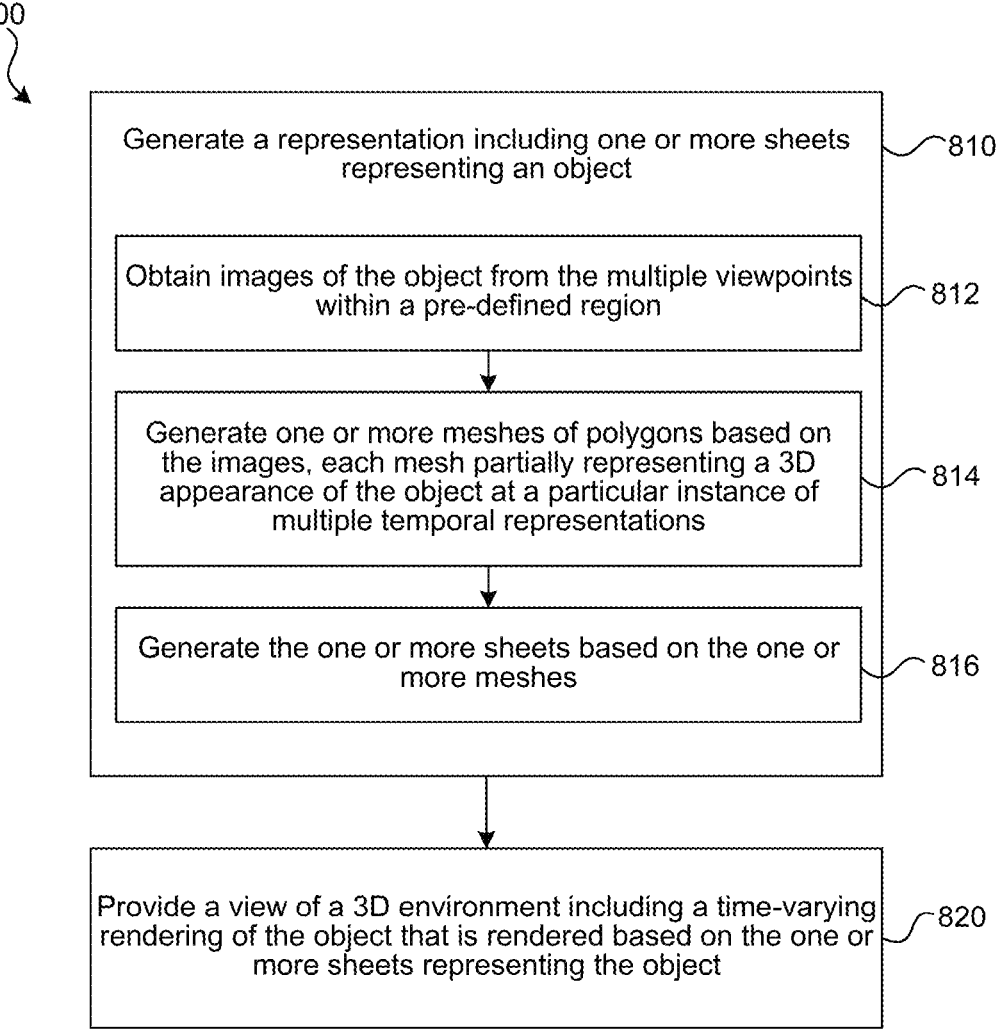

Generate a representation including one or more sheets representing an object — 810

Obtain images of the object from the multiple viewpoints within a pre-defined region — 812

Generate one or more meshes of polygons based on the images, each mesh partially representing a 3D appearance of the object at a particular instance of multiple temporal representations — 814

Generate the one or more sheets based on the one or more meshes — 816

Provide a view of a 3D environment including a time-varying rendering of the object that is rendered based on the one or more sheets representing the object — 820

FIG. 8

Device 900

Processing Unit(s) 902

Comm. Interface(s) 908

Display(s) 912

Memory 920

Operating System 930

Instruction Set(s) 940

3D Content Instruction Set 942

Sheets Instruction Set 944

Stereo Image Content Instruction Set 946

904

I/O Device(s) & Sensor(s) 906

Programming Interface(s) 910

Image Sensor System(s) 914

TIME-VARYING RENDERING OF AN OBJECT WITHIN A 3D ENVIRONMENT

CROSS-REFERENCE TO RELATED APPLICATIONS

This application claims the benefit of U.S. Provisional Application Ser. No. 63/407,868 filed Sep. 19, 2022, which is incorporated herein in its entirety.

TECHNICAL FIELD

The present disclosure generally relates to providing a view of a time-varying rendering of an object within a three-dimensional (3D) environment, such as 3D objects added to appear at 3D positions within the 3D environments depicted in such images.

BACKGROUND

Various techniques are used to enable the capturing and editing of images, video, and other content depicting three-dimensional (3D) environments. However, existing systems may not provide various desirable attributes, such as efficiently and/or accurately enabling the altering of stereo image content to include added content.

SUMMARY

Various implementations disclosed herein include devices, systems, and methods that provide a compact representation of a three-dimensional (3D) object (e.g., a bird, a plant, etc.) used to provide views from a viewpoint within a limited region. For example, a limited region may be needed for a headbox area in which a viewpoint may change one meter backwards/forwards/right/left, etc. (e.g., constrained to a view dependent head box). Some techniques provide a simplified representation of an entire, static 3D scene for headbox viewing by obtaining RGBD images (e.g., color image data and depth data) as input and generating a textured mesh, targeting a configurable number of triangles, texture size, and fill rate, to provide a 3D representation that is more compact than a standard 3D representation (e.g., a 3D point cloud, a 3D mesh, etc.). By contrast, the various implementations disclosed herein provide a technique that: (a) may be object-specific (e.g., just the bird rather than the entire 360 scene), (b) may include time-based content (e.g., animation, lighting, interactive content, etc.) rather than static content, (c) uses gridified cards to provide a photorealistic appearance, (d) may be rendered in stereo, and (e) uses multiple sprite sheets for different visual attribute layers associated with the object. For example, the multiple sheets may include color data, normals data (for lighting), computer graphic position data, specularity/roughness data, an ID map to identify objects in the scene, and the like.

An exemplary use of techniques described herein may be to render a 3D object on top of 3D content (e.g., a movie), and that object may be interacted with (e.g., move around, change lighting effects, etc.) with real-time effects using sheets for one or more of the visual attribute layers (e.g., color, depth, opacity, lighting, roughness/texture, material attributes, animation, and the like). The one or more sheets, also referred to herein as sprite sheets, utilize sprite rendering techniques, where lighting, material, and attribute information may be stored and utilized via the same simple sprite color card system. In an exemplary implementation, the one or more sheets may be compressed and bundled. By utilizing the sprite sheets, a time-varying rendering of an object (e.g., a virtual object), may be configured to efficiently run on a low powered device with a simple graphics system. For example, utilizing layered sprite sheets provides efficiency for use on such low powered devices (e.g., via a web browser running on a mobile device, such as a smartphone) such that an interactive time-varying rendering of an object (e.g., an interactive virtual object) may be added to or blended with layered video footage (e.g., an interactive virtual character layered on top of a movie). In some implementations, the layer(s) may be controlled externally.

In some implementations, a representation of an object is generated by obtaining images (e.g., real or virtual images) of the object from the multiple viewpoints within a pre-defined region (e.g., 32 positions within the headbox), generating one or more meshes of polygons based on the images, where each mesh partially represents a 3D appearance of the object at a particular instance, and generating one or more sheets based on the one or more meshes. For example, flip books of the one or more meshes of polygons may be created for the representation of the object. In some implementations, the flip books of polygons during run time may be evaluated, averaged, and fit for most effective playback at view box sweet spots. Additionally, in some implementations, the flip books of polygons for the representation of the object may be branched with lower level of detail (LOD) versions and textured sprite information may be mipmapped and compressed to create a robust LOD system.

In general, one innovative aspect of the subject matter described in this specification can be embodied in methods that include the actions of, at an electronic device having a processor, generating a representation including one or more sheets representing an object, the one or more sheets representing aspects of one or more meshes partially representing a three-dimensional (3D) appearance of the object based on multiple viewpoints and multiple temporal representations. Generating the representation may include obtaining images of the object from the multiple viewpoints within a pre-defined region, generating the one or more meshes of polygons based on the images, each mesh partially representing the 3D appearance of the object at a particular instance of the multiple temporal representations, wherein at least some surface portions of the object that are visible from viewpoints outside of a pre-defined region are unrepresented by the polygons, and generating the one or more sheets based on the one or more meshes. The actions may further include providing a view of a 3D environment including a time-varying rendering of the object, wherein the time-varying rendering of the object is rendered based on the one or more sheets representing the object.

These and other embodiments can each optionally include one or more of the following features.

In some aspects, the one or more sheets include a include data sheet including multiple elements having values, each of the multiple elements representing color of multiple portions of the mesh in view from a different viewpoint of the multiple viewpoints. In some aspects, the one or more sheets include a color data sheet including multiple elements having values, each of the multiple elements representing color of multiple portions of the mesh in view from a different viewpoint of the multiple viewpoints for a different instance of the multiple temporal representations.

In some aspects, the one or more sheets include a normals data sheet including multiple elements having values, each of the multiple elements representing normal vector data of multiple portions of the mesh in view from a different viewpoint of the multiple viewpoints. In some aspects, the one or more sheets include a normals data sheet including multiple elements having values, each of the multiple elements representing normal vector data of multiple portions of the mesh in view from a different viewpoint of the multiple viewpoints for a different instance of the multiple temporal representations.

In some aspects, the one or more sheets include a material attributes data sheet including multiple elements having values, each of the multiple elements representing material attributes of multiple portions of the mesh in view from a different viewpoint of the multiple viewpoints. In some aspects, the one or more sheets include a material attributes data sheet including multiple elements having values, each of the multiple elements representing material attributes of multiple portions of the mesh in view from a different viewpoint of the multiple viewpoints for a different instance of the multiple temporal representations.

In some aspects, the one or more sheets include a position data sheet including multiple elements having values, each of the multiple elements representing positioning information of multiple portions of the mesh in view from a different viewpoint of the multiple viewpoints. In some aspects, the one or more sheets include a position data sheet including multiple elements having values, each of the multiple elements representing positioning information of multiple portions of the mesh in view from a different viewpoint of the multiple viewpoints for a different instance of the multiple temporal representations.

In some aspects, the one or more sheets include an animation data sheet including multiple elements having values, each of the multiple elements representing animation information of multiple portions of the mesh in view from a different viewpoint of the multiple viewpoints. In some aspects, the one or more sheets include an animation data sheet including multiple elements having values, each of the multiple elements representing animation information of multiple portions of the mesh in view from a different viewpoint of the multiple viewpoints for a different instance of the multiple temporal representations.

In some aspects, the time-varying rendering of the object includes one or more selectable elements. In some aspects, the actions further include updating the view of the time-varying rendering of the object within the 3D environment based on an interaction event with the one or more selectable elements of the time-varying rendering of the object.

In some aspects, the 3D environment is 3D video content and the time-varying rendering of the object is overlayed on the 3D video content within the view of the 3D environment. In some aspects, providing the view of the time-varying rendering of the object includes animating at least a portion of the object for one or more subsequent frames of the view of the 3D environment.

In some aspects, providing the view of the time-varying rendering of the object includes changing a lighting effect to at least a portion of the object for one or more subsequent frames of the view of the 3D environment. In some aspects, changing the lighting effect to at least the portion of the object is based on determining a material attribute at the portion of the object.

In some aspects, the pre-defined region includes a head-box view and the multiple viewpoints includes different positions within the headbox view. In some aspects, each polygon of the respective mesh of polygons includes a plurality of edges, wherein one or more of the plurality of edges of at least one polygon includes a transparent edge, the method further including updating the view of the time-varying rendering of the object based on the transparent edge of the at least one polygon.

In some aspects, the view of a 3D environment including the time-varying rendering of the object includes stereo-scopic image pairs including left eye content corresponding to a left eye viewpoint and right eye content corresponding to a right eye viewpoint In some aspects, the 3D environment is a physical environment. In some aspects, the 3D environment is a virtual environment. In some aspects, the 3D environment is an extended reality (XR) environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 2A-2C illustrate exemplary views of the object in FIG. 1, in accordance with some implementations.

FIGS. 3A-3C illustrate meshes of polygons corresponding to the views of the object in FIGS. 2A-2C, respectively, in accordance with some implementations.

FIGS. 4A-4C illustrate different perspectives of a mesh of polygons corresponding to a particular view of the object in FIG. 1, in accordance with some implementations.

FIGS. 5A-5C illustrate sheets representing aspects of a mesh partially representing an appearance of the object of FIG. 1 based on multiple viewpoints and multiple temporal representations, in accordance with some implementations.

FIG. 8 illustrates an exemplary process for providing a view of a 3D environment including a time-varying rendering of an object in accordance with some implementations.

Figure 1:
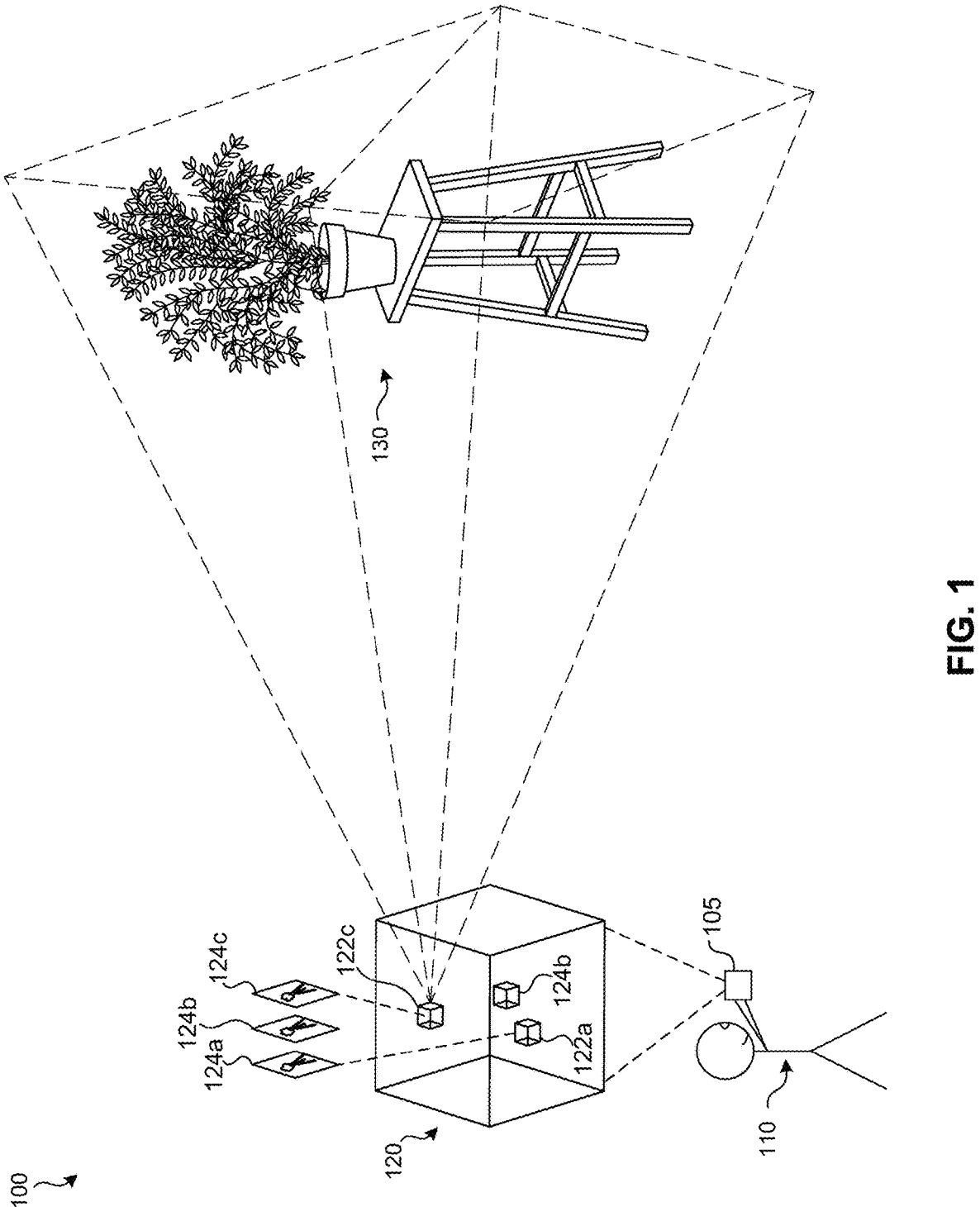
FIG. 1 illustrates an exemplary electronic device providing views of an object from viewpoints within a limited region in a physical environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 105 providing views of an object 130 (e.g., a plant on a stool) from viewpoints within a limited region (e.g., a headbox view 120) operating in an environment 100. In FIG. 1, the environment 100 includes a user 110. The headbox view 120 illustrates a headbox area in which a viewpoint may change approximately one meter backwards/forwards/right/left, etc. (e.g., a user 125 may be wearing the device 105 as a head mounted device (HMD)). In other words, the viewpoint may be constrained to a view dependent head box. For example, the views of the object 130 may include multiple viewpoints 122a, 122b, 122c (referred to herein as viewpoints 122) within a pre-defined region (e.g., 16, 32, or any number of different viewpoint positions within the limited head box viewing area), where each of the multiple viewpoints 122a, 122b, 122c correspond with the views 124a, 124b, 124c, respectively. Thus, for any given image frame of the object 130, there are multiple different viewpoints available to be rendered. For example, techniques described herein may take advantage of the fact that virtual reality (VR) scenes, mixed reality (MR) scenes, extended reality (XR) scenes, and the like, may be typically viewed from within a limited viewing region (e.g., headbox view 120 represented as a cube), and leverages the limited viewing region to optimize the geometry and textures in a rendered scene.

The electronic device 105 may include one or more cameras, microphones, depth sensors, or other sensors that can be used to capture information about and evaluate their physical environment 100 and the objects within the environment 100, as well as information about the user 110. The device 105 may capture and use information about the physical environment 100 from its sensors to provide stereo image content (e.g., a stereo image pair or stereo video) depicting the environment 100. In some implementations, the stereo image content is captured using multiple cameras (e.g., two cameras spaced apart from one another to capture left eye and right eye content). In some implementations, image content from a single camera is modified to generate stereo content, e.g., content for left eye and right eye views.

In some implementations, the environment 100 is a physical environment, and FIG. 1 illustrates capturing information (e.g., images) of an object 130 from multiple viewpoints but within the limited head box viewing area as illustrated by headbox view 120. Alternatively, environment 100 is an operating environment that illustrates the multiple viewpoints of a head box viewing area of a virtual object (e.g., object 130).

FIGS. 2A-2C illustrate exemplary views of the object in FIG. 1, in accordance with some implementations. In particular, FIGS. 2A-2C illustrate three different views of the object 130 (e.g., a potted plant on top of a stool). For example, view 210 of FIG. 2A is a direct view (e.g., 0 degrees) of the object 130, view 220 of FIG. 2B is an angled view (e.g., turned 45 degrees) of the object 130, and view 230 of FIG. 2C is a perpendicular view (e.g., turned 90 degrees) of the object 130. Thus, for each of the different orientations/poses of the object 130 (0 degrees, 45 degree turn, etc.), a set of images (e.g., real or virtual images) of the object 130 may be obtained from the multiple viewpoints within a pre-defined region (e.g., 32 positions within the headbox, such as headbox view 120).

FIGS. 3A-3C illustrate meshes of polygons corresponding to the views of the object in FIGS. 2A-2C, respectively, in accordance with some implementations. In particular, FIGS. 3A-3C illustrate three different meshes of polygons corresponding to the views of the object 130 from FIGS. 2A-2C, respectively. For example, view 310 of FIG. 3A is a direct view (e.g., 0 degrees) of a mesh of polygons corresponding to the object 130, view 320 of FIG. 3B is an angled view (e.g., turned 45 degrees) of a mesh of polygons corresponding to the object 130, and view 330 of FIG. 3C is a perpendicular view (e.g., turned 90 degrees) of a mesh of polygons corresponding to the object 130. In some implementations, the one or more meshes of polygons are generated based on obtained images, where each mesh partially represents a 3D appearance of the object 130 at a particular instance of multiple temporal representations (e.g., multiple frames). In some implementations, at least some surface portions of the object 130 that are visible from viewpoints outside of a pre-defined region are unrepresented by the polygons. For example, the one or more meshes of polygons may be generated for the surfaces of the object that would be viewed within a pre-defined region (e.g., 32 positions within the headbox view). However, the one or more meshes of polygons may not represent back surfaces, sides, occluded surfaces, etc. because those portions would not be viewed at the particular frame from the limited viewing region, thus, would not need to be rendered. The improved time to render the object may allow more processing efficiency (e.g., allow real-time updates and interactions with the rendering of the object integrated with a 3D video such as a movie in a web browser on mobile device).

FIGS. 4A-4C illustrate different perspectives of a mesh of polygons corresponding to a particular view of the object in FIG. 1, in accordance with some implementations. In particular, FIGS. 4A-4C illustrate different viewpoints of a mesh of polygons corresponding to the view of the object 130 from FIG. 2A (e.g., 0 degrees). In other words, FIGS. 4A-4C illustrate what the mesh of polygons for a particular view of the object would look like from another angle that would not be incorporate into a head box view (e.g., views of the polygons of the back surfaces, sides, occluded surfaces, that would not be represented because those portions would not be viewed at the particular frame from the limited viewing region of the head box view). For example, view 410 of FIG. 4A is a direct view of a mesh of polygons corresponding to the view of FIG. 2A, thus each of the viewable surfaces/portions of the object 130 are represented by the mesh of polygons. However, view 420 of FIG. 4B is an angled view (e.g., turned 45 degrees) and view 430 of FIG. 4C is a perpendicular view (e.g., turned 90 degrees) of a mesh of polygons corresponding to the view of FIG. 2A, thus each of the viewable surfaces/portions of the object 130 are represented by the mesh of polygons, but the nonviewable surfaces/portions are not shown, instead the polygons are illustrated as being distorted or angled back because rendering the nonviewable portions is not necessary. If the object 130 does need to turn for rendering, then different meshes of polygons for those different angles can be obtained.

In some implementations, the generated mesh of polygons may be referred to as gridified cards which can provide photorealistic appearances of the object. In some implementations, the generated mesh of polygons can be generated for rendering a view of the object in stereo.

FIGS. 5A-5C illustrate sheets representing aspects of a mesh partially representing an appearance of the object of FIG. 1 based on multiple viewpoints and multiple temporal representations, in accordance with some implementations. In some implementations, the sheets 510, 520, 530, and the like (e.g., sprite sheets), are generated based on the one or more meshes of polygons. In particular, the sheets may be generated for different visual attribute layers associated with the object. For example, the one or more sheets may represent aspects (e.g., visual attribute layers) of the one or more meshes such as images of RGB, normal data, lighting effects, materials of the object, and the like. For example, the sheet 510 of FIG. 5A represents a color data sheet for each polygon, sheet 520 of FIG. 5B represents the materials information for each polygon (e.g., wood on the stool vs. leaves of the plant), and sheet 530 of FIG. 5C represents normals/vector data for lighting effects for each polygon. The color data sheet 510 may include multiple elements that represent color of multiple portions of the mesh in a view from a different viewpoint of the multiple viewpoints (e.g., one set of RGB data for each viewpoint within the headbox region, i.e., each unique viewpoint is represented by an image/imposter). The material attributes information for the sheet 520 may include multiple elements that represent different materials that affect lighting effects, specularity/roughness of the object, etc. corresponding to the multiple portions of the mesh in a view from a different viewpoint of the multiple viewpoints (e.g., one set of material attributes data for each viewpoint within the headbox region, i.e., each unique viewpoint is represented by an image/imposter). The normals data sheet 530 may include multiple elements that represent normal vector data corresponding to the multiple portions of the mesh in a view from a different viewpoint of the multiple viewpoints (e.g., one set of material attributes data for each viewpoint within the headbox region, i.e., each unique viewpoint is represented by an image/imposter). In some implementations, the lighting effects may include direct lighting (e.g., diffuse and specular), transmission, and indirect lighting, as well as some extra effects, such as caustics, bloom, motion blur, etc.

In some implementations, one or more of the sheets may include time-based content (e.g., animation, lighting, interactive content, etc.) rather than static content associated with the object. For example, each polygon of the meshes of polygons may be associated with a portion of the object, where particular portions may have animation components (e.g., plant leaves blowing in the wind), and a corresponding animation sheet may be used to identify which portions of the object may be animated. In some implementations, the one or more sheets may include color data, normals data (for lighting), computer graphic position data, specularity/roughness data, an ID map to identify objects in the scene, and the like. An exemplary use of the techniques described herein may be to render a 3D object on top of 3D content (e.g., a movie), and that object can be interacted with (e.g., move around, change lighting effects, etc.) with real-time effects using sheets for one or more of the visual attribute layers (e.g., color, depth, opacity, lighting, roughness/texture, material attributes, animation, and the like).

In some implementations, sprite rendering techniques utilize the one or more sheets, also referred to herein as sprite sheets, where lighting, material, and attribute information may be stored and utilized via the same simple sprite color card system. In an exemplary implementation, the one or more sheets may be compressed and bundled. By utilizing the sprite sheets, a time-varying rendering of an object (e.g., a virtual object), may be configured to efficiently run on a low powered device with a simple graphics system. For example, utilizing layered sprite sheets provides efficiency for use on such low powered devices (e.g., via a web browser running on a mobile device, such as a smartphone) such that an interactive time-varying rendering of an object (e.g., an interactive virtual object) may be added to or blended with layered video footage (e.g., an interactive virtual character layered on top of a movie). In some implementations, the layer(s) may be controlled externally.

Figure 6:
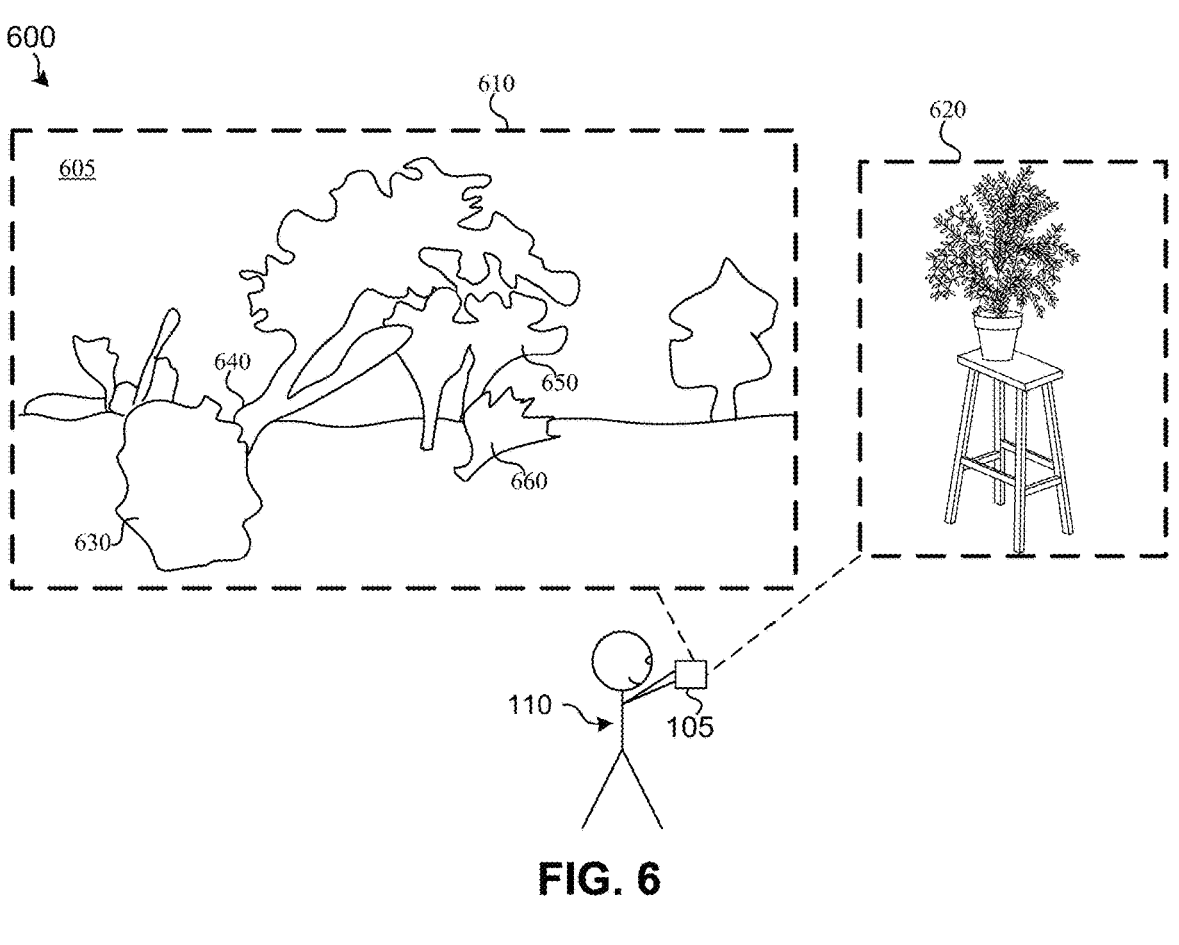
FIG. 6 illustrates an exemplary electronic device obtaining three-dimensional (3D) stereo image content and a representation of an object based on one or more sheets representing the object, in accordance with some implementations.

FIG. 6 illustrates an example environment 600 of an exemplary electronic device 105 obtaining image content 610 and a representation 620 of an object (e.g., object 130) based on one or more sheets representing the object, in accordance with some implementations. In FIG. 6, the environment 605 of image content 610 (e.g., an image, a video, virtual or mixed content, 3D, stereo, etc.) depicts an outdoor area that includes various objects such as bushes 630, 650, 660 and tree 640. In some implementations, obtaining the representation 620 may include obtaining the one or more sheets representing the object (e.g., sheets such as data sheets 510, 520, 530, etc. that represent one or more aspects of the object 130).

In some implementations, the image content 610 may have been captured by a stereo camera. The stereo image content 610 may be wide-angle, e.g., a 180° stereo image pair or 180° stereo video content stored as projections (e.g., equirectangular). Depth data may also be obtained and used to enable integration of the 3D object content for the representation 620.

Figure 7:
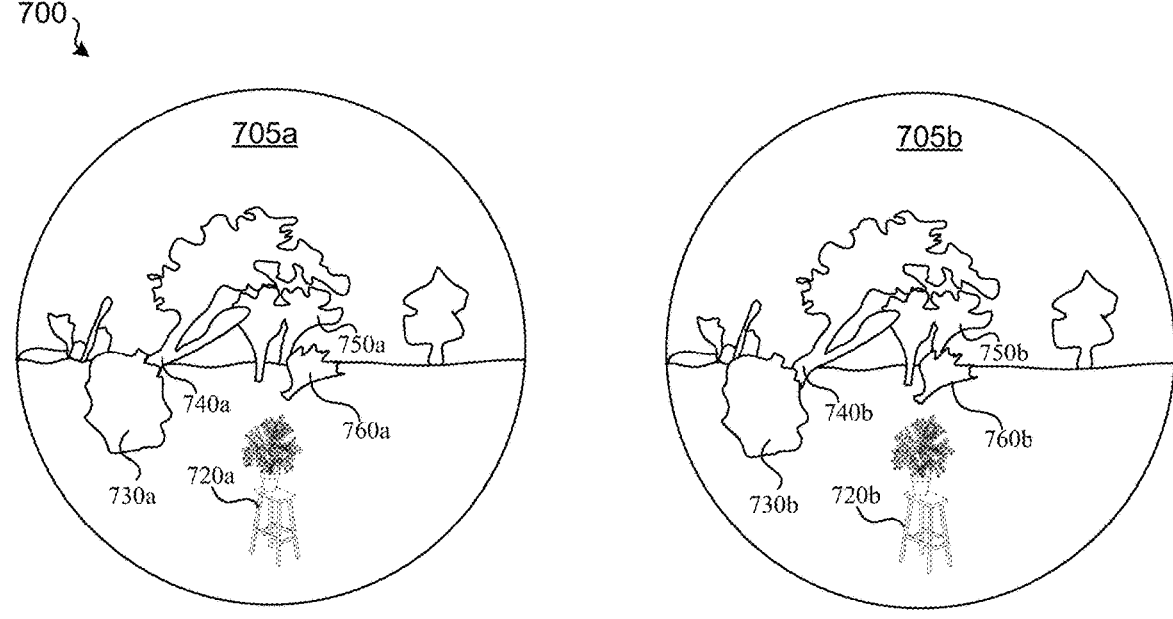
FIG. 7 illustrates an exemplary view of a combination of the 3D stereo image content and the representation of the object of FIG. 6, in accordance with some implementations.

FIG. 7 illustrates a view 700 of a combination of the 3D stereo image content 610 and the representation 620 of the object of FIG. 6, in accordance with some implementations. In this example, the view 700 includes a left eye image 705a that includes a depiction of the physical environment 605 that includes a depiction 730a of the bush 630, a depiction 740a of the tree 640, a depiction 750a of the bush 650 and a depiction 760a of the bush 660, as well as a depiction 720a of the representation 620. Similarly, the view also includes a right eye image 705b that includes a depiction of the physical environment 605 that includes a depiction 730b of the bush 630, a depiction 740b of the tree 640, a depiction 750b of the bush 650 and a depiction 760b of the bush 660, as well as a depiction 720b of the representation 620. The left eye image 705a and the right eye image 705b are not identical and represent views of the environment from slightly different viewpoints, i.e., viewpoints corresponding to a left eye and a right eye of a viewer. As a specific example, because of such a slight difference in viewpoint, depiction 730a may obscure more depiction 740a than depiction 730b obscures of depiction 740b.

In some implementations, the representation 620 is a time-varying rendering of the object 130. In some implementations, the depiction 720a, 720b of the representation 620 may be an interactable or selectable element. In some implementations, updating a view of the depiction 720a, 720b of the representation 620 (e.g., a time-varying rendering of the object 130) within the 3D environment may be based on an interaction event (e.g., a user selecting/touching the depiction 720 of the object, a verbal command, or another type of interaction with the depiction 720). In some implementations, based on the interaction event.

In some implementations, integrating the 3D object content (representation 620) into the 3D stereo image content 610 may involve rendering the 3D object content into each of a left eye image and a right eye image of the stereo image content 610. Integrating the 3D object content into the stereo image content may involve determining how to alter the 3D object content for the left eye image and the right eye image independently. In some implementations, integrating the 3D object content into the stereo image content may involve receiving time-varying 3D object content for a plurality of instances in time and integrating the time-varying 3D object content for each of the plurality of instances in time with the stereo image content. In some implementations, integrating the 3D object content into the stereo image content may involve determining a depth associated with a position identified for the 3D object, detecting the blur quality of the at least a portion of the stereo image content based on the determined depth, and blurring the 3D object content based on the blur quality.

In some implementations, integrating the time-varying rendering of the object into the stereo image content of FIG. 7 may involve determining a gaze focal point and detecting whether to alter the time-varying rendering of the object based on the gaze focal point. For example, based on a detected gaze of the user towards the time-varying rendering of the object, techniques described herein may update the view of the time-varying rendering of the object. For example, as the user focuses on the rendering of the depiction 720a,b of the plant, different rendering effects may be initiated (e.g., moving/turning the object, highlighting the object, and the like).

Virtual content that is added to stereo image content may have differing visual characteristics than the stereo image content to which it is added. For example, a virtual object may have a higher resolution and/or better color quality than the stereo image content to which it is added. The original stereo image content may appear to be more blurred relative to added virtual content which may appear to be more crisp or detailed. In some implementations, blur is automatically applied to virtual content based on characteristics of the original stereo content. Such blurring may be depth specific (e.g., only blurring virtual content that is at least a threshold distance away or blurring content in a way that is dependent upon distance-more distance used to provide more blur, etc.). Such blurring may be dependent upon whether the virtual content that is being added is part of a defined portion of the stereo image content (e.g., part of the foreground, part of the background, etc.). A level of blur within stereo image content (or a particular portion of such content) may be determined based on known intrinsic camera data, camara capture conditions (e.g., light levels), or other information indicative of how blurry captured content will be. Alternatively, or additionally, a level of blur within stereo image content (or a particular portion of such content) may be determined based on evaluating the stereo image content itself, e.g., using an algorithm or machine learning model configured to predict a level of blur based on stereo image content input.

FIG. 8 is a flowchart illustrating a method 800 for providing a view of a 3D environment including a time-varying rendering of an object. In some implementations, a device such as electronic device 105, or another device, or a combination of two or more of such devices, performs method 800. In some implementations, method 800 is performed on a mobile device, desktop, laptop, HMD, ear-mounted device or server device. The method 800 is performed by processing logic, including hardware, firmware, software, or a combination thereof. In some implementations, the method 800 is performed on a processor executing code stored in a non-transitory computer-readable medium (e.g., a memory).

At block 810, the method 800 generates a representation including one or more sheets representing an object, the one or more sheets representing aspects of one or more meshes partially representing a three-dimensional (3D) appearance of the object based on multiple viewpoints and multiple temporal representations. For example, the one or more sheets may represent aspects (visual attribute layers) of the one or more meshes such as images of RGB, normal data, lighting effects, materials of the object, and the like. The multiple viewpoints may include 16, 32, or any number of different positions in a headbox region (e.g., headbox view 120 of FIG. 1). The multiple temporal representations may refer to the different viewpoints for each frame of an animation. Additionally, or alternatively, the multiple temporal representations may refer to multiple different conditions (e.g., in different lighting conditions).

In an exemplary implementation, generating the representation of the object at block 810 includes the process of blocks 812-816. At block 812, the method 800 obtains images (e.g., real or virtual images) of the object from the multiple viewpoints within a pre-defined region. In some implementations, the pre-defined region includes a headbox view (e.g., headbox view 120) and the multiple viewpoints includes different positions within the headbox view (e.g., 32 positions within the headbox view).

In some implementations, obtaining images of the object may include obtaining stereo image content depicting a physical environment. The stereo image content may have been captured by a stereo camera. The stereo image content may be wide-angle, e.g., a 180° stereo image pair or 180° stereo video content stored as projections (e.g., equirectangular). Depth data may also be obtained and used to enable integration of the 3D object content.

At block 814, the method 800 generates the one or more meshes of polygons based on the images, each mesh partially representing the 3D appearance of the object at a particular instance of the multiple temporal representations, wherein at least some surface portions of the object that are visible from viewpoints outside of a pre-defined region are unrepresented by the polygons. For example, the one or more meshes of polygons may be generated for the surfaces of the object that would be viewed within a pre-defined region (e.g., 32 positions within the headbox view). However, the one or more meshes of polygons may not represent back surfaces, sides, occluded surfaces, etc., because those portions would not be viewed at the particular frame from the limited viewing region, thus, would not need to be rendered. The improved time to render the object may allow more processing efficiency (e.g., allow real-time updates and interactions with the rendering of the object integrated with a 3D video such as a movie in a web browser on mobile device).

At block 816, the method 800 generates the one or more sheets based on the one or more meshes. For example, the one or more sheets may represent aspects (e.g., visual attribute layers) of the one or more meshes such as images of RGB, normal data, lighting effects, materials of the object, and the like. For example, the sheet 510 represents a color data sheet for each polygon, sheet 520 represents the materials information for each polygon (e.g., wood on the stool vs. leaves of the plant), and sheet 530 represents normals/vector data for lighting effects for each polygon.

In some implementations, a representation of an object is generated by obtaining images (e.g., real or virtual images) of the object from the multiple viewpoints within a predefined region (e.g., 32 positions within the headbox), generating one or more meshes of polygons based on the images, where each mesh partially represents a 3D appearance of the object at a particular instance, and generating one or more sheets based on the one or more meshes. For example, flip books of the one or more meshes of polygons may be created for the representation of the object. In some implementations, the flip books of polygons during run time may be evaluated, averaged, and fit for most effective playback at view box sweet spots. Additionally, in some implementations, the flip books of polygons for the representation of the object may be branched with lower level of detail (LOD) versions and textured sprite information may be mipmapped and compressed to create a robust LOD system.

In some implementations, the one or more sheets include a color data sheet including multiple elements (e.g., images/imposters) having values (e.g., pixels), such as sheet 510 of FIG. 5A. In some implementations, each of the multiple elements represent color of multiple portions of the mesh in a view from a different viewpoint of the multiple viewpoints (e.g., one set of RGB data for each viewpoint within the headbox region, i.e., each unique viewpoint is represented by an image/imposter). Additionally, or alternatively, in some implementations, each of the multiple elements representing color of multiple portions of the mesh in view from a different viewpoint of the multiple viewpoints for a different instance of the multiple temporal representations (e.g., one set of RGB data for each viewpoint within the headbox region for each frame of the object movement, i.e., each unique viewpoint for each frame combination is represented by an image/imposter).

In some implementations, the one or more sheets include a normals data sheet (e.g., lighting) including multiple elements (e.g., images/imposters) having values (e.g., pixels), such as sheet 530 of FIG. 5C. In some implementations, each of the multiple elements represent normal vector data of multiple portions of the mesh in a view from a different viewpoint of the multiple viewpoints (e.g., one set of normal/lighting data for each viewpoint within the headbox region, i.e., each unique viewpoint is represented by an image/imposter). Additionally, or alternatively, in some implementations, each of the multiple elements representing normal vector data of multiple portions of the mesh in a view from a different viewpoint of the multiple viewpoints for a different instance of the multiple temporal representations (e.g., one set of normal/lighting data for each viewpoint within the headbox region for each frame of the object movement, i.e., each unique viewpoint for each frame combination is represented by an image/imposter). In some implementations, the lighting effects may include direct lighting (e.g., diffuse and specular), transmission, and indirect lighting, as well as some extra effects, such as caustics, bloom, motion blur, etc.

In some implementations, the one or more sheets include a material attributes data sheet (e.g., different materials affect lighting effects, specularity/roughness of the object, etc.) including multiple elements (e.g., images/imposters) having values (e.g., pixels), such as sheet 520 of FIG. 5B. In some implementations, each of the multiple elements represent material attributes of multiple portions of the mesh in a view from a different viewpoint of the multiple viewpoints (e.g., one set of material attributes data for each viewpoint within the headbox region, i.e., each unique viewpoint is represented by an image/imposter that represents a material of that portion of the object). Additionally, or alternatively, in some implementations, each of the multiple elements representing material attributes of multiple portions of the mesh in a view from a different viewpoint of the multiple viewpoints for a different instance of the multiple temporal representations (e.g., one set of material attributes data for each viewpoint within the headbox region for each frame of the object movement, i.e., each unique viewpoint for each frame combination is represented by an image/imposter).

In some implementations, the one or more sheets include a position data sheet (e.g., different materials affect lighting effects, specularity/roughness of the object, etc.) including multiple elements (e.g., images/imposters) having values (e.g., pixels), such as sheet 520 of FIG. 5B. In some implementations, each of the multiple elements represent positioning information (e.g., pose) of multiple portions of the mesh in a view from a different viewpoint of the multiple viewpoints (e.g., one set of positioning/pose data for each viewpoint within the headbox region, i.e., each unique viewpoint is represented by an image/imposter that represents a material of that portion of the object). Additionally, or alternatively, in some implementations, each of the multiple elements representing positioning information of multiple portions of the mesh in a view from a different viewpoint of the multiple viewpoints for a different instance of the multiple temporal representations (e.g., one set of positioning/pose data for each viewpoint within the headbox region for each frame of the object movement, i.e., each unique viewpoint for each frame combination is represented by an image/imposter).

In some implementations, the one or more sheets include an animation data sheet (e.g., different materials affect lighting effects, specularity/roughness of the object, etc.) including multiple elements (e.g., images/imposters) having values (e.g., pixels), such as sheet 520 of FIG. 5B. In some implementations, each of the multiple elements represent animation information of multiple portions of the mesh in a view from a different viewpoint of the multiple viewpoints (e.g., one set of animation data for each viewpoint within the headbox region, i.e., each unique viewpoint is represented by an image/imposter that represents a material of that portion of the object). Additionally, or alternatively, in some implementations, each of the multiple elements representing animation information of multiple portions of the mesh in a view from a different viewpoint of the multiple viewpoints for a different instance of the multiple temporal representations (e.g., one set of animation data for each viewpoint within the headbox region for each frame of the object movement, i.e., each unique viewpoint for each frame combination is represented by an image/imposter).

At block 820, the method 800 provides a view of a 3D environment including a time-varying rendering of the object, wherein the time-varying rendering of the object is rendered based on the one or more sheets representing the object. For example, the system provides a view of a 3D environment (e.g., an XR environment) depicting (e.g., a projection of) the stereo image content and the integrated time-varying rendering of the object (e.g., view 700 of FIG. 7 of the depiction 720a, 720b of the representation 620 of the object 130). In some implementations, the stereo image content depicts a background (e.g., relatively distant objects and surroundings) for the time-varying rendering of the object that is added, e.g., in the foreground, e.g., at a relatively closer position. In some implementations, the time-varying content may be an animation of multiple frames. For example, each frame maybe animated based on a 3D mesh. In some implementations, the time-varying content may include altering of a static frame (e.g., one mesh) based on changing lighting in the 3D environment. In some implementations, the time-varying content may provide interaction with the object. In some implementations, rendering each frame may be based on changing the inputs of the one or more sheets.

In some implementations, the time-varying rendering of the object includes one or more selectable elements. In some implementations, the method 800 may further include updating the view of the time-varying rendering of the object within the 3D environment based on an interaction event (e.g., a user selecting/touching the object) with the one or more selectable elements of the time-varying rendering of the object. For example, the depiction 720a, 720b of the representation 620 of the object 130 in the view 700 of FIG. 7 may include one or more portions that be interacted with by a user. For example, if the plant leaves are touched, they could have a different animation effect (e.g., show the leaves quivering/shrinking after being touched) than if the stool is touched (e.g., allows the user to rotate or click and move the entire object-plant and stool). For example, if the object is a character animation, such as a teddy bear, the time-varying rendering of the object may allow a user to interact with different portions of the teddy bear that would have different effects (e.g., touching one paw would cause a different reaction than touching the belly of the rendering of the teddy bear).

In some implementations, the 3D environment is 3D video content and the time-varying rendering of the object is overlayed on the 3D video content within the view of the 3D environment. For example, a use case may include adding a new object to a movie scene and that object can be interacted with (e.g., move around, change lighting effects, etc.) with real-time effects using sheets. For example, a user could interact with the depiction 720a, 720b of the representation 620 of the object 130 in the view 700 of FIG. 7, but not interact with other elements in the view 700 because they may be prerecorded content (e.g., a movie scene).

In some implementations, providing the view of the time-varying rendering of the object includes animating at least a portion of the object for one or more subsequent frames of the view of the 3D environment. In some implementations, providing the view of the time-varying rendering of the object includes changing a lighting effect to at least a portion of the object for one or more subsequent frames of the view of the 3D environment. For example, based on the lighting of the environment changing between frames of data, the rendered view of lighting effects may be updated for the time-varying rendering of the object. For example, after identifying a source and a position of the lighting source (e.g., a new frame of the video content shows a sun), utilizing the normals data sheet, the techniques described herein can update the rendering of the object based on the position of the updated light source (e.g., show a reflection on the top left portion of the representation of the plant for the sun now being shown in a next frame of the video content).

In some implementations, generating and providing the time-varying rendering of the object may include providing 3D object content (e.g., virtual content) depicting a 3D object (e.g., a plant, animal, nest, etc.). The 3D object content may be a stream of virtual content (e.g., within a viewpoint of the limited region) representing movement or a changing appearance of the 3D object over time based on updating the one or more sheets (e.g., changing lighting effects based on the normals data and/or materials data of the object such as wood of the stool versus the leaves of the plant for the same object).

In some implementations, changing the lighting effect to at least the portion of the object is based on determining a material attribute at the portion of the object. For example, based on a materials attributes data sheet, the techniques described herein can determine whether the material of the portion of the object excepts/absorbs/reflects lighting (e.g., wood of the stool reflects differently than leaves of the plant, or a portion of the object includes a reflective material such as a metal).

In some implementations, integrating the time-varying rendering of the object into the stereo image content of FIG. 7 may involve determining a gaze focal point and detecting whether to alter the time-varying rendering of the object based on the gaze focal point. For example, based on a detected gaze of the user towards the time-varying rendering of the object, techniques described herein may update the view of the time-varying rendering of the object. For example, as the user focuses on the rendering of the depiction 720a,b of the plant, different rendering effects may be initiated (e.g., moving/turning the object, highlighting the object, and the like).

In some implementations, adaptative stenciling techniques may be utilized to stencil along the edges to assist in drawing the images faster for the real-time engine (e.g., via a GPU). In an exemplary implementation, each polygon of the respective mesh of polygons includes a plurality of edges, where one or more of the plurality of edges of at least one polygon includes a transparent edge, and the method 800 may further include updating the view of the time-varying rendering of the object based on the transparent edge of the at least one polygon.

In some implementations, the view of a 3D environment including the time-varying rendering of the object includes a stereoscopic image pairs including left eye content corresponding to a left eye viewpoint and right eye content corresponding to a right eye viewpoint (e.g., stereo view, applying stereo depth, add more polygons/triangles, different sizes, etc.). In some implementations, the method 800 integrates the time-varying rendering of the object into stereo image content, where the time-varying rendering of the object is altered based on a quality associated with at least a portion of the stereo image content. The time-varying rendering of the object may be positioned within the stereo image pair (as described herein with reference to FIG. 7 or otherwise). The time-varying rendering of the object may be positioned based on detected planes, floors, depths, etc. The stereo content may be inspected and depths of different portions of the stereo content used to provide occlusions and positioning. The stereo content may be updated to show shadows from the time-varying rendering of the object.

In some implementations, the 3D environment, upon which the time-varying rendering of the object is overlayed thereon, may be a physical environment (e.g., augmented reality with the time-varying rendering of the object overlayed on top of views of a real environment—pass through video), a virtual environment, an extended reality (XR) environment, or the like.

Figure 9:
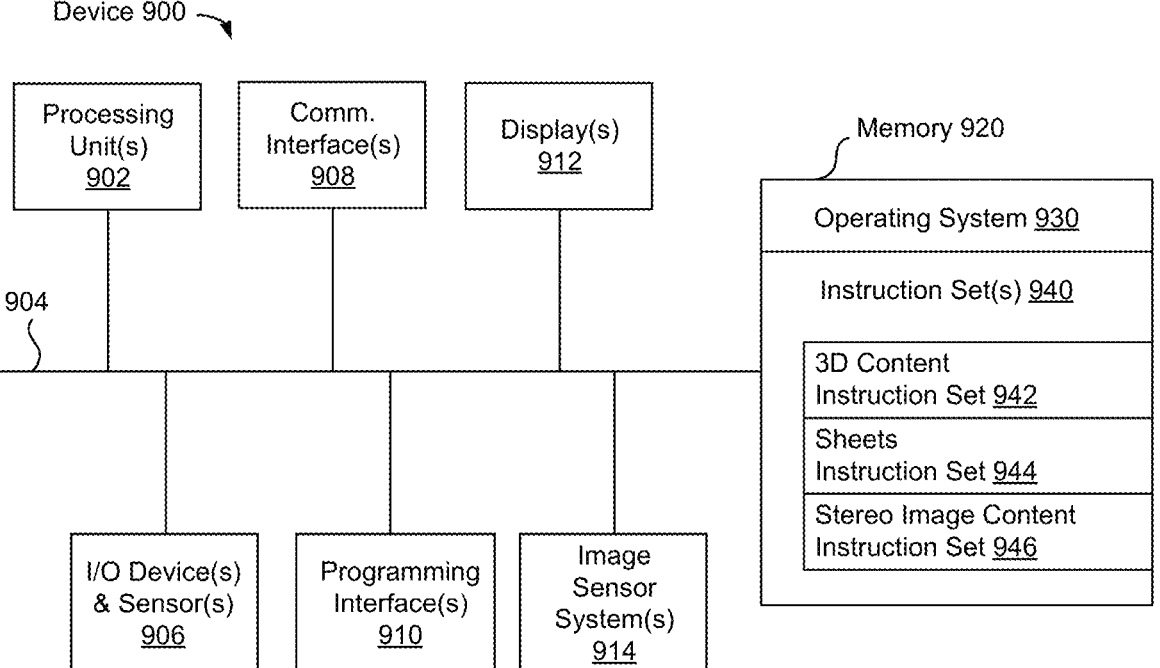
FIG. 9 is a block diagram of an electronic device of in accordance with some implementations.

FIG. 9 is a block diagram of electronic device 900. Device 900 illustrates an exemplary device configuration for such as electronic device 105 that may perform one or more of the techniques disclosed herein. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more display(s) 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more display(s) 912 include one or more displays configured to present a view of a 3D environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 900 includes a single display. In another example, the device 900 includes a display for each eye of the user.

In some implementations, the one or more display(s) 912 include one or more audio producing devices. In some implementations, the one or more display(s) 912 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more display(s) 912 may additionally or alternatively be configured to generate haptics.

In some implementations, the one or more image sensor systems 914 are configured to obtain image data that corresponds to at least a portion of a physical environment. For example, the one or more image sensor systems 914 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a 3D content instruction set 942 configured to, upon execution, capture, generate, use, share, or render 3D content such as a virtual 3D object, as described herein. The instruction set(s) 940 further include a sheets instruction set 944 configured to, upon execution, generate one or more sheets for different visual attribute layers associated with the object, as described herein. The instruction set(s) 940 further includes a stereo image content instruction set 946 configured to, upon execution, capture, generate, use, share, or render stereo image content as described herein. The instruction set(s) 940 may be embodied as a single software executable or multiple software executables.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor:
generating a representation comprising one or more sheets representing an object, the one or more sheets representing aspects of one or more meshes partially representing a three-dimensional (3D) appearance of the object based on multiple viewpoints and multiple temporal representations, wherein generating the representation comprises:
obtaining images of the object from the multiple viewpoints within a pre-defined region;
generating the one or more meshes of polygons based on the images, each mesh partially representing the 3D appearance of the object at a particular instance of the multiple temporal representations, wherein at least some surface portions of the object that are visible from viewpoints outside of a pre-defined region are unrepresented by the polygons; and
generating the one or more sheets based on the one or more meshes; and
providing a view of a 3D environment including a time-varying rendering of the object, wherein the time-varying rendering of the object is rendered based on the one or more sheets representing the object.

2. The method of claim 1, wherein the one or more sheets comprise a color data sheet comprising multiple elements having values, each of the multiple elements representing color of multiple portions of the mesh in view from a different viewpoint of the multiple viewpoints.

3. The method of claim 1, wherein the one or more sheets comprise a normals data sheet comprising multiple elements having values, each of the multiple elements representing normal vector data of multiple portions of the mesh in view from a different viewpoint of the multiple viewpoints.

4. The method of claim 1, wherein the one or more sheets comprise a material attributes data sheet comprising multiple elements having values, each of the multiple elements representing material attributes of multiple portions of the mesh in view from a different viewpoint of the multiple viewpoints.

5. The method of claim 1, wherein the one or more sheets comprise a position data sheet comprising multiple elements having values, each of the multiple elements representing positioning information of multiple portions of the mesh in view from a different viewpoint of the multiple viewpoints.

6. The method of claim 1, wherein the one or more sheets comprise an animation data sheet comprising multiple elements having values, each of the multiple elements representing animation information of multiple portions of the mesh in view from a different viewpoint of the multiple viewpoints.

7. The method of claim 1, wherein the one or more sheets comprise multiple elements having values, each of the multiple elements representing an attribute of multiple portions of the mesh in view from a different viewpoint of the multiple viewpoints for a different instance of the multiple temporal representations.

8. The method of claim 1, wherein the time-varying rendering of the object comprises one or more selectable elements.

9. The method of claim 8, further comprising:
updating the view of the time-varying rendering of the object within the 3D environment based on an interaction event with the one or more selectable elements of the time-varying rendering of the object.

10. The method of claim 1, wherein the 3D environment is 3D video content and the time-varying rendering of the object is overlayed on the 3D video content within the view of the 3D environment.

11. The method of claim 1, wherein providing the view of the time-varying rendering of the object comprises animating at least a portion of the object for one or more subsequent frames of the view of the 3D environment.

12. The method of claim 1, wherein providing the view of the time-varying rendering of the object comprises changing a lighting effect to at least a portion of the object for one or more subsequent frames of the view of the 3D environment.

13. The method of claim 12, wherein changing the lighting effect to at least the portion of the object is based on determining a material attribute at the portion of the object.

14. The method of claim 1, wherein the pre-defined region comprises a headbox view and the multiple viewpoints comprises different positions within the headbox view.

15. The method of claim 1, wherein each polygon of the respective mesh of polygons comprises a plurality of edges, wherein one or more of the plurality of edges of at least one polygon comprises a transparent edge, the method further comprising updating the view of the time-varying rendering of the object based on the transparent edge of the at least one polygon.

16. The method of claim 1, wherein the view of a 3D environment including the time-varying rendering of the object comprises stereoscopic image pairs comprising left eye content corresponding to a left eye viewpoint and right eye content corresponding to a right eye viewpoint.

17. A device comprising:
one or more sensors;
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
generating a representation comprising one or more sheets representing an object, the one or more sheets representing aspects of one or more meshes partially representing a three-dimensional (3D) appearance of the object based on multiple viewpoints and multiple temporal representations, wherein generating the representation comprises:
obtaining images of the object from the multiple viewpoints within a pre-defined region;
generating the one or more meshes of polygons based on the images, each mesh partially representing the 3D appearance of the object at a particular instance of the multiple temporal representations, wherein at least some surface portions of the object that are visible from viewpoints outside of a pre-defined region are unrepresented by the polygons; and
generating the one or more sheets based on the one or more meshes; and
providing a view of a 3D environment including a time-varying rendering of the object, wherein the time-varying rendering of the object is rendered based on the one or more sheets representing the object.

18. A method comprising:
at an electronic device having a processor:
obtaining images of an object from multiple viewpoints within a pre-defined region;
generating one or more meshes of polygons based on the images, each mesh partially representing a three-dimensional (3D) appearance of the object at a particular instance of the multiple viewpoints, wherein at least some surface portions of the object that are visible from viewpoints outside of the pre-defined region are unrepresented by the polygons; and
generating a representation comprising one or more sheets representing the object, the one or more sheets representing aspects of the one or more meshes partially representing the 3D appearance of the object based on the multiple viewpoints and multiple temporal representations; and
providing a view of a 3D environment including a time-varying rendering of the object that is rendered based on the one or more sheets.

19. The method of claim 18, wherein the one or more sheets comprise a color data sheet comprising multiple elements having values, each of the multiple elements representing color of multiple portions of the mesh in view from a different viewpoint of the multiple viewpoints.

20. The method of claim 18, wherein the one or more sheets comprise multiple elements having values, each of the multiple elements representing an attribute of multiple portions of the mesh in view from a different viewpoint of the multiple viewpoints for a different instance of the multiple temporal representations.

* * * * *